(12) United States Patent
Clark

(10) Patent No.: US 6,771,422 B1
(45) Date of Patent: Aug. 3, 2004

(54) REAL TIME OPTICAL INFORMATION PROCESSING SYSTEM

(76) Inventor: Natalie Clark, 9408 Peralte NE., Albuquerque, NM (US) 87109

( * ) Notice: Subject to any disclaimer, the term of this patent is extended or adjusted under 35 U.S.C. 154(b) by 0 days.

(21) Appl. No.: 09/289,531

(22) Filed: Apr. 9, 1999

(51) Int. Cl.$^7$ ............................. G02B 27/10; G02B 7/02

(52) U.S. Cl. ........................................ 359/625; 359/822

(58) Field of Search ................................ 359/822, 823, 359/634, 637; 356/121; 250/201.9

(56) References Cited

U.S. PATENT DOCUMENTS 5,610,707 A * 3/1997 Duncan et al. ............ 356/121

* cited by examiner

Primary Examiner—Ricky Mack
(74) Attorney, Agent, or Firm—R W Becker & Associates; R W Becker

(57) ABSTRACT

The performance of all pattern recognition and tracking systems is limited by the depth of field of the optical imaging system used to acquire the images. Here an optical imaging system that produces images with a wide depth of field independent of f-number is provided, and includes a plurality of photo-detector elements, a way to measure the amount of defocus aberration for each photo-detector element, and a way to compensate for such aberration in order to produce an enhanced image with a large depth of field independent of f-number.

13 Claims, 1 Drawing Sheet

REAL TIME OPTICAL INFORMATION PROCESSING SYSTEM

BACKGROUND

The present invention relates to enhancing the depth of field of an optical imaging system independent of its F# (f number).

The performance of all pattern recognition and tracking systems is limited by the depth of field of the optical imaging system used to acquire the images. Conventional optical systems require the aperture stop to be reduced in order to achieve a higher depth of field. Reducing the aperture causes the exposure (flux time integration time) to be reduced. In addition, reducing the aperture stop causes higher spatial frequencies of the object to be attenuated, thus degrading the image. Other image processing techniques have been used to overcome these obstacles. However, to date, all such image processing techniques to produce enhanced depth of field images are based on numerically intensive mathematical image processing algorithms that cannot be implemented in real time. Hence, such techniques are used as a post processing technique to produce images with an enhanced depth of field.

Adaptive optics technology does not fall neatly into any of the established engineering disciplines; it combines elements from optics (imaging systems and interferometry), electro-optics (photon sensing and modulation devices), electrical engineering, mechanical engineering, and chemistry. The use of active and adaptive optics terminology is not standard throughout the optic community. The literature often confuses and interchanges the usage of these terms. For example, as pointed out in Robert Tyson's text entitled "Principles of Adaptive Optics", Academic Press, New York, 1991, many researchers differentiate them by bandwidth. They refer to systems operating below $\frac{1}{10}$ Hz as active and those operating above $\frac{1}{10}$ Hz as adaptive. This definition is used widely in the astronomy community. Other restrictions on the definition of adaptive optics have been seen. Many people skilled in the art consider adaptive optics to be restricted to coherent phase-only correction. The definition we will use to describe this invention, and it is one that is gaining more and more popularity, is that everything having to do with actively controlling a beam of light is active optics. As discussed in Tysons aforementioned book entitled "Principles of Adaptive Optics", adaptive optics is a subset of the much broader discipline, active optics. The terms adaptive and active optics in this invention will be used as many contemporary workers skilled in the art tend to do throughout the current literature. The term adaptive optics is used when it specifically applies to wavefront sensing (sensing aberrations) and/or wavefront correction. In this invention, the broader term active optics is used to describe devices that can be used to control light—such as tunable filters, programmable waveplates and other spatial light modulators.

As discussed is several optical information-processing patents, pattern recognition is extremely sensitive to a variety of distortions including defocus. U.S. Pat. Nos. 5,485,312 and 5,111,515 are all optical information processing systems that can benefit from this invention that improves the depth of field. As discussed in this disclosure, all other optical information processing systems used for pattern recognition and tracking suffer from this drawback. This invention overcomes this obstacle by enabling a single image with a large depth-of-field to be used instead of trying to recognize or track out-of-focus objects.

As discussed in U.S. Pat. No. 4,141,652, various adaptive optics systems have been devised to improve resolution by correcting for distortions induced in light wavefronts by atmospheric disturbances and imperfections of the receiving optical systems. U.S. Pat. No. 4,141,652 relates to improvements in the Hartmann-type sensors. (See also U.S. Pat. Nos. 4,399,356 and 5,120,128.)

U.S. Pat. Nos. 4,935,614 and 5,026,977 describe double pass phase shifting interferometric adaptive optic systems which only operate with coherent light.

Other phase diversity techniques such as those disclosed in U.S. Pat. Nos. 5,384,455, 4,308,602 and 5,610,707 are based on numerically intensive algorithms and an adaptive optics post processing technique because they cannot be implemented in real-time imaging systems. Moreover, these phase retrieval techniques require sufficient spatial frequency terms in order to operate. Global convergence for extremum values is difficult to achieve. In addition, these inventions operate only on incoherent imaging systems and hence are limited in their application.

Although there are several patents awarded in the field of optical information processing, none take advantage of using adaptive optics to produce well-defined targets by enhancing the optical depth of field. Likewise, no other inventions in the field of adaptive optics is used to enhance the depth of field. Techniques reported in the literature to enhance the depth of field are post-processing techniques that cannot be implemented in real-time.

It is therefore an object of the present invention to significantly enhance imaging, pattern recognition and tracking of a very wide range of imaging systems, such as cameras, microscopes, machine vision systems, optical correlator systems, etc., especially in real-time.

SUMMARY OF THE INVENTION

The inventive optical imaging system comprises a plurality of photo-dector elements; means for measuring the amount of defocus aberration for each photo-detector element; and means for compensating for such aberration to produce an image with an enhanced depth of field independent of f number.

Whereas in conventional optical systems the depth of field depends on the focal number of the particular optical system, the inventive system enables all objects within the field of view to be viewed in focus. The novel active and adaptive optic techniques utilized by the present invention compensate for spatial and chromatic aberrations and consequently enable a large depth of field independent of the optical system's F#, especially in real-time. The enhanced depth of field in turn greatly enhances the ability of optical information processing systems to recognize and track patterns.

This invention is a novel method of enabling an optical imaging system to have a large depth of field independent of F#. The F# of an optical system is f/D, where f is the effective focal length and D is the diameter of the exit pupil of the optical system. It is well known that all imaging systems can be characterized in terms of its stops and pupils. The aperture stop is the element in an imaging system that physically limits the angular size of the cone of light accepted by the system and it therefore governs the total radiant flux reaching the image plane. It may be simply the edge of one of the lenses in the system, or it may be an opaque screen with a hole in it specifically introduced for that purpose. In a camera, the iris diaphragm acts as an aperture stop with a variable diameter.

The field stop is the element that physically restricts the size of the image (or field of view). It may be an opaque screen with a hole in it specifically introduced for that purpose, or as in a camera the film may effectively serve as the field stop. The entrance pupil is the image of the aperture stop, as viewed from object space, formed by all of the optical elements preceding it. Frequently it is a virtual image and thus is the "apparent" limiting element for determining the angular size of the cone of light accepted by the system. The exit pupil is the image of the aperture stop, as seen from image space, formed by all of the optical elements following it. The aberrations of a system, as well as its resolution, are often associated with the exit pupil. Ideally, for a point object, a spherical wave is launched by the exit pupil and converges to an ideal point image.

Any ray that emanates from an off axis object point and physically passes through the center of the aperture stop is called the chief ray. A chief ray is directed toward the center of the entrance pupil as it enters the system and appears to emanate from the center of the exit pupil as it leaves the system. Any ray emanating from an on axis object point that physically grazes the rim of the aperture stop is called the marginal ray. A marginal ray appears to be directed toward the edge of the entrance pupil as it enters the system and appears to emanate from the edge of the exit pupil as it leaves the system. It is noted that an image plane is located at every axial position where the marginal ray crossed the optic axis, and that the height of the chief ray at such a point determines the height and magnification of the corresponding image.

The above discussion so far has been based on the assumption that all of our imaging systems exhibit ideal behavior, i.e. they cause a point object to be mapped into a point image at the proper location according to well known geometrical optics. In practice however, we may encounter aberrations that cause no ideal images to be formed, and these aberrations may be of such magnitude that they seriously degrade the image (even after diffraction effects are accounted for). The subject of optical aberrations is quite complex.

We may divide aberrations into two general categories: those that are wavelength dependent and those that are wavelength independent. The former are called chromatic aberrations and the latter are called monochromatic aberrations. In ordinary optical design, first the number and types of elements and their general configuration is chosen. Secondly, the powers, materials, thickness, and spacings of the elements are determined. These are usually chosen to control the chromatic aberrations and the Petzval curvature of the system, as well as the focal length, working distances, field of view, and aperture. In the third stage of the design process, the shapes of the elements are adjusted to correct the basic aberrations to desired values. In the fourth stage of the design process, the residual aberrations are reduced if necessary to an acceptable level. Often, in conventional optical design, a figure of merit such as contrast is used to optimize the design. In many cases, there are tradeoffs in the design. For example, in microscopes the objectives are optimized for a specific conjugate. As a consequence, when not operating at that conjugate imaging spherical aberration is introduced causing a degradation in both resolution and image quality. This in turn inhibits pattern recognition and tracking.

The invention described in this disclosure overcomes these obstacles by, for example, incorporating an optional tunable filter in conjunction with a spatial light modulator/stepper motor combination that acts as a programmable element that compensates for wavelength independent focus aberrations. When the tunable filter is used in conjunction with the spatial light modulator/stepper motor the depth of the field is increased for each wavelength. If the tunable filter is not used, broadband operation results in a significantly enhanced depth of field. This invention enables the depth of field to be significantly enhanced by compensating for the defocus aberrations associated with each photodetector element. The enhanced depth of field described in this specification allows all objects within the field of view to be imaged with up to diffraction limited quality. In conventional optics, one must reduce the F# to change the depth of focus. This invention does not require one to make this sacrifice.

Depth of focus rests on the assumption that for a given optical system, there exists a blur (due to defocusing) of small enough size such that it will not adversely affect the performance of the system. Depth of focus is the amount by which the image may be shifted longitudinally with respect to some reference plane (e.g. film, photodetector) which will introduce no more than the acceptable blur. The depth of field is the amount by which the object may be shifted before the acceptable blur is produced. The size of the acceptable blur may be specified as the linear diameter of the blur spot or as an angular blur. Many books discuss lens design with respect to depth of field. The invention disclosed here uses, for example, the spatial light modulator 40 to act as the adaptive (or active) optic element to compensate for the defocus.

BRIEF DESCRIPTION OF THE DRAWING

Further specific features of the inventive imaging system will be described in detail subsequently with the aid of the single schematic drawing, which illustrates one exemplary embodiment of such a system. The inventive system uniquely combines several components, which are individually available as commercial products. This disclosure will not get into the particulars of how these active optic devices function, such as how they direct the process of reading out the electronic signals from the the computer 100 nor how they specifically change analog electronic signals into optical modulation of incident light and how they specifically store that information, for such details are already known in existing systems. Instead the disclosure will describe the details which are pertinent to the invention as a whole, and any details which might be somehow novel or specifically required by the illustrated embodiment.

DESCRIPTION OF PREFERRED EMBODIMENTS

Figure 1:
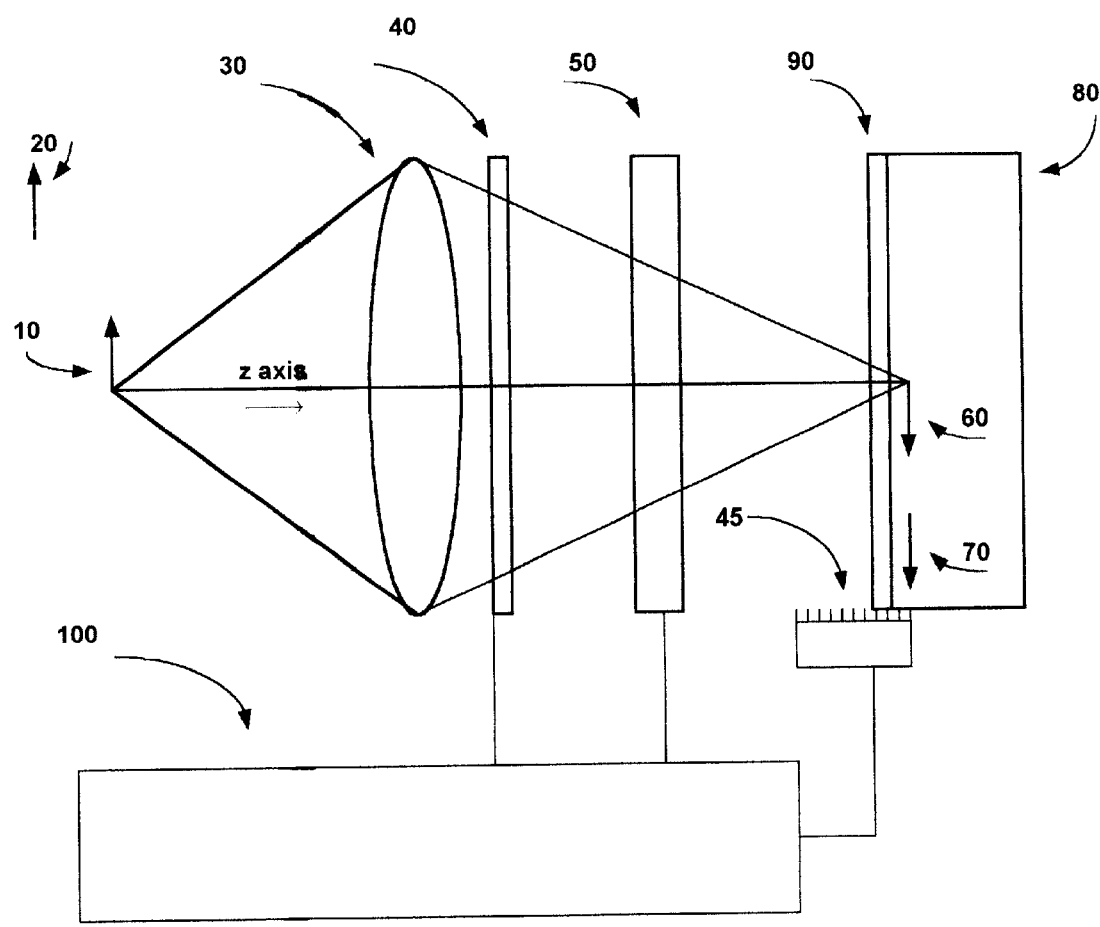

Referring now to the drawing in detail, two objects 10 and 20 are imaged onto the photodetector array or elements 80. It should be noted that more than two objects could also be involved, the number being limited only by the resolution of the system. The photodetector elements are typically a CCD camera, although any photodetector element responding to the irradiance of impinging light can be used, such as, but not limited to, photo-diodes. Often, a frame grabber is used to obtain images. The use of photodetectors and frame grabbers is well know to those skilled in the art. Typically, frame grabbers are interfaced directly to the PCI bus of the computer. One such frame grabber, one tested in this invention, is the Matrox Meteor Card. All such methods to acquire images from photodetector elements are widely known to those skilled in the art. Moreover, user manuals that come with each particular photodetector element arrays describe in sufficient detail and provide technical support so that even those individuals not skilled in the art are able to obtain images.

The stepper motor 45 can be used to modulate the optical path distance between the lens 30 and the focal plane 90, hence compensating for the amount of defocus aberration for each photodetector element. High resolution stepper motors such as the Eastern Air model LA23ECKY-200A have step sizes on the order of 0.5 microns. Thus, such a stepper motor 45 can only be used to modulate the optical path in integral steps of at best 0.5 microns. From an optical standpoint, 0.5 microns is a relatively large amount (optically an entire wave at 500 nm wavelength). Most controllers, as is the case for the Easter Air Stepper motor are accomplished via standard RS232 ports of the information processing/controls system 100. The manufacturer supplies sufficient information in their instruction manuals so that a wide variety of workers are able to operate the devices. Hence, control of the stepper motor is widely known. It is also widely known to those skilled in the art how to use the stepper motor (or any other motor or translation stage) to modulate optical path.

A phase modulating spatial light modulator in the form of a variable retarder plate or waveplate 40 can also be used to compensate for the amount of defocus aberration for each photodetector element by modulating the optical path distance between the lens 30 and the focal plane 90 in much smaller amounts. The spatial light modulator can include liquid crystal waveplates or micro-mirror devices. One particular variable retarder plate is the Meadowlark Variable Retarder device which can modulate the optical path by as little as 1 nanometer to as much as 2 microns. There is much flexibility of where the variable retarder plate can be positioned. Workers skilled in the art are well aware of how to implement the variable retarder plate and how to use its birefringence properties to modulate optical path length. The Meadowlark variable retarder devices are particularly easy to operate as they interface directly to the standard parallel port of a computer and come with software drivers. The present invention utilizes a phase modulating spatial light modulator and/or stepper motor to enhance the depth of field of an imaging system. Combining the stepper motor and modulator enables one to get a wider dynamic range of compensation while maintaining fine compensation via the phase modulating spatial light modulator compensation. If the stepper motor resolution is sufficient, the modulator is not necessary. Similarly, if the system does not require a large dynamic range (exceeding 2 microns) then the stepper motor is not necessary.

The optional tunable filter 50 is used in conjunction with the optical path compensator elements 40 and 45 to compensate for chromatic aberrations. A wide variety of liquid crystal tunable filters can be used. However, the CRI (Cambridge Research Institute) liquid crystal tunable filter is widely known and is commercially available; in addition the CRI tunable filters are easy to use since they connect directly to the serial port of any computer. Use of the liquid crystal tunable filters is widely know to those skilled in the art.

In a conventional imaging system the images 60 and 70 would not be imaged in the same conjugate image plane. This invention is novel because the images 60 and 70 of objects 10 and 20 (located in different object planes) are imaged in the same object plane 90 on the photo-detector array 80. Although a conventional auto focus technique such as that used in commercially available cameras could be used to compute the defocus, such conventional focusing techniques such as the one used in some cameras do not lend themselves to enhancing the depth of focus in real time.

The stepper motor 45, the phase modulating spatial light modulator 40, the tunable filter 50 and the photodetector elements are all interfaced to the computer 100, or other information processor, such as an optical correlator, as previously described. What is novel is how all the components are operated to produce images with an enhanced depth of field. The operation of the invention is carried out as follows. First one decides what optical path increments are desired. For each desired optical path increment along the optic axis the motor and/or the modulator are positioned as discussed previously. For each position, an image is acquired as previously discussed. For each pair of images the amount of defocus is computed for each photodetector element using the phase diversity technique as discussed subsequently.

The phase diversity type computation disclosed in this invention is based on solving the transport equation. The term "phase diversity" refers to methods of determining optical wavefront errors by measuring the irradiance distribution in the 3-dimensional volume surrounding a plane in the optical system. Typically, these techniques involve forming an image at the best focus and an additional image taken slightly out of focus.

Once determined, the wavefront errors are compensated for by the active optics and/or the stepper motor as previously discussed. This invention pertains to using the phase diversity technique to generate an enhanced depth of field image.

Virtually all phase diversity techniques are used only as a post processing method of phase retrieval because of the computational intensity associated with the technique. The difference between a well-focused and slightly defocused image contains information about the phase of the object. The phase diversity technique is a way to retrieve this phase information from images formed by a coherent or incoherent imaging system. The phase retrieval based on the irradiance transport equation offers advantages over other wavefront sensors. First, the transport equation is presented and its physical meaning is briefly discussed along with disclosing how it is to be used to enhance the depth of field. Assume that a paraxial beam is propagating along the optic or z axis in FIG. 1. The complex amplitude can be expressed as $\sqrt{I(x,y',z)}\exp(ikW(x,y',z))$, where $I(x,y',z)$ is the irradiance, $W(x,y',z)$ is the phase term in terms of wavelength $\lambda$, and the wavenumber $k=2\pi/\lambda$. A According to Huygen's principle the propagation of light from the plane z=0 to another plane $z \geq 0$ is described by the convolution of the amplitude $u(x,z=0)$ with spherical waves. In the paraxial approximation the spherical waves are replaced by parabolic waves. This approximation is quite good if the cone of emerging rays is narrow enough. Thus, based upon this the approximation of a parabolic equation yields the transport equation $$\nabla_\perp I \cdot \nabla_\perp W + I\nabla_\perp^2 W + \frac{\partial I}{\partial z} = 0 \qquad (1)$$

where $$\nabla_\perp \equiv \frac{\partial}{\partial x} + \frac{\partial}{\partial y}$$

is the gradient operator in the (x,y) plane which is normal to the direction of beam propagation.

The first term $\nabla_\perp I \cdot \nabla_\perp W$ is often referred to as the prism term; it represents the irradiance variation induced by the transverse shift associated with the inhomogeneous beam to the local tilt of the wavefront in the direction of $\nabla_\perp W$. The second term, $I\nabla_\perp^2 W$ is often referred to as the lens term; it describes the convergence (or divergence) of the beam. The local focal length of the lens term is inversely proportional to the lens term. The third term, $\partial I/\partial z$ describes the propagation of the beam irradiance induced by the lens and prism term.

Assuming uniform illumination of $I_0$ over the pupil (and zero outside), then $\nabla I=0$ everywhere except at the pupil edge where $$\nabla I = -I_0 n \delta_c, \quad (2)$$

where $\delta_c$ is the Dirac delta distribution around the edge of the pupil and n is the unit vector orthogonal to the edge and pointing outward. Substituting into the transport equation (1) yields, $$\frac{1}{I_0}\frac{\partial I}{\partial z} = \frac{\partial W}{\partial n}\delta_c - P\nabla^2 W \quad (3)$$

where P(x,y) is the pupil function defined to be 1 inside the pupil and 0 outside the pupil. The wavefront derivative of the pupil edge in the outward direction is mathematically expressed as $$\frac{\partial W}{\partial n} = n \cdot \nabla W.$$

Equation (3) shows that the fractional change in illumination is based upon two parts. For internal points the wavefront is governed by the Laplacian operator $\nabla^2 W$. And for edge components the equation for wavefront radial slope $\partial W/\partial n$ governs. Consequently one needs only reconstruct the wavefront surface W by solving a partial differential equation using any discrete mathematical technique including but not limited to finite difference or multigrid techniques or any other well known technique. The enhanced field of view image is formed by selecting only the "best focus" value for each photo-detector element. The "best focus" value for a particular photo-detector element is the value that has the least amount, as determined by solving the transport equation, of defocus aberration.

In summary, this invention enables images with a large depth of field independent from F# to be formed using active optic devices. The technique uses adaptive optics phase diversity techniques and offers advantages not only in performance but also in speed and cost. Such high depth of field images cannot be accomplished using traditional optical methods such as stopping down the F#.

The present invention is, of course, in no way restricted to the specific disclosure of the specification and drawing, but also encompasses any modifications within the scope of the appended claims.

What I claim is:

1. An optical imaging system that produces images with a large depth of field independent of f number, comprising:

a plurality of photo-detector elements;

computer means for computing the amount of defocus aberration for each photo detector element, wherein said computer means is responsive to electronic signals for computing said amount of defocus aberration by solving the following transport equation for each of said photo detector elements:

$$\nabla_\perp I \cdot \nabla_\perp W + I\nabla_\perp^2 W + \frac{\partial I}{\partial z} = 0$$

where I is the irradiance of light incident upon the photo-detector elements, W is a phase term in terms of wavelength $\lambda$, and Z is the direction of beam propagation; and means for compensating for said aberration.

2. An optical imaging system according to claim 1, wherein said photodetector elements comprise a CCD camera.

3. An optical imaging system according to claim 1, wherein said means for compensating for said aberration comprises mechanical, optical, or both mechanical and optical.

4. An optical imaging system according to claim 3, wherein said means for compensating is mechanical means in the form of a stepper motor.

5. An optical imaging system according to claim 3, wherein said means for compensating is optical means in the form of a phase modulating spatial light modulator that includes liquid crystal retarder plates or micro-mirror devices.

6. An optical imaging system according to claim 3, wherein said means for compensating is mechanical in the form of a stepper motor, as well as optical in the form of a phase modulating spatial light modulator.

7. An optical imaging system according to claim 1, which further comprises means for spectrally filtering light that reaches said photo-detector elements.

8. An optical imaging system according to claim 7, wherein said means for spectrally filtering light comprises a liquid crystal tunable filter.

9. An optical imaging system that produces images with a large depth of field independent of f number, comprising:

a plurality of photo-detector elements;

means for computing the amount of defocus aberration for each photo detector element; and mechanical means in the form of a stepper motor for compensating for said aberration.

10. A method of producing images with a large depth of field independent of f number, including the steps of:

providing a plurality of photo-detector elements;

computing the amount of defocus aberration for each photo-detector element by solving the following transport equation using computer means responsive to electronic signals:

$$\nabla_\perp I \cdot \nabla_\perp W + I\nabla_\perp^2 W + \frac{\partial I}{\partial z} = 0$$

where I is the irradiance of light incident upon the photo-detector elements, W is a phase term in terms of wavelength $\lambda$, and Z is the direction of beam propagation; and compensating for said aberration.

11. A method of producing images according to claim 10, wherein said method is carried out in real-time.

12. A method of producing images according to claim 10, wherein said compensating step comprises using mechanical means, optical means, or both.

13. A method of producing images according to claim 10, which includes the additional step of spectrally filtering light that reaches said photodetector elements.

* * * * *